US012804480B2

(12) United States Patent
Lu

(10) Patent No.: US 12,804,480 B2
(45) Date of Patent: Nov. 17, 2026

(54) COMMUNICATION METHOD AND APPARATUS

(71) Applicant: GUANGDONG OPPO MOBILE TELECOMMUNICATIONS CORP., LTD., Dongguan (CN)

(72) Inventor: Fei Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 309 days.

(21) Appl. No.: 18/640,924

(22) Filed: Apr. 19, 2024

(65) Prior Publication Data

US 2024/0267801 A1 Aug. 8, 2024

Related U.S. Application Data

(63) Continuation of application No. PCT/CN2022/071418, filed on Jan. 11, 2022.

(51) Int. Cl.
*H04W 36/00* (2009.01)
*H04W 60/04* (2009.01)
*H04W 84/04* (2009.01)

(52) U.S. Cl.
CPC ....... *H04W 36/0061* (2013.01); *H04W 60/04* (2013.01); *H04W 84/042* (2013.01)

(58) Field of Classification Search
CPC . H04W 36/00; H04W 36/0061; H04W 60/04; H04W 84/042
See application file for complete search history.

(56) References Cited

U.S. PATENT DOCUMENTS

2024/0179661 A1* 5/2024 Zhu ........................ H04W 60/06
2024/0196222 A1* 6/2024 Kim ....................... H04W 12/06
2025/0142511 A1* 5/2025 Kuge ..................... H04W 48/02
2025/0274348 A1* 8/2025 Sung ..................... H04W 84/10

FOREIGN PATENT DOCUMENTS

CN 111757557 A 10/2020
CN 112822756 A 5/2021
CN 113055829 A 6/2021
CN 113286332 A 8/2021
(Continued)

OTHER PUBLICATIONS

PCT International Search Report for International Application No. PCT/CN2022/071418 dated Sep. 21, 2022.
(Continued)

*Primary Examiner* — Brian D Nguyen
(74) *Attorney, Agent, or Firm* — Quarles & Brady LLP

(57) ABSTRACT

This application provides a communication method and apparatus, and the method includes: receiving, by a terminal device, first information sent by a network device (S201), where the first information is used to indicate an identity of a first stand-alone non-public network SNPN which the terminal device is handed over to or is to be handed over to through an SNPN handover. In this manner, during the SNPN handover or after the SNPN handover, the terminal device is notified of the identity of the first SNPN selected by a network device side, thereby avoiding a failure of identity authentication caused by inconsistency of serving network names.

17 Claims, 5 Drawing Sheets

(56) References Cited

FOREIGN PATENT DOCUMENTS

| | | | |
|---|---|---|---|
| CN | 113438196 | A | 9/2021 |
| WO | 2021161167 | A1 | 8/2021 |

OTHER PUBLICATIONS

PCT Written opinion for International Application No. PCT/CN2022/071418 dated Sep. 21, 2022.
"Connected mobility for NPN" of Huawei, 3GPP TSG-RAN3 Meeting # 105bis R3-195766 dated Oct. 5, 2019.
"Study on enhanced support of Non-Public Networks phase 2" of Ericsson, Futurewei, Convida Wireless, Charter, China Unicom, ETRI; Cisco, China Mobile, Lenovo, Motorola Mobility, Qualcomm, ZTE, Philips, Intel, MATRIXX Software, SHARP, InterDigital, LG Electronics, NEC, Samsung, OPPO, T-Mobile USA, NICT, DISH Network, vivo, KPN, CableLabs, 3GPP SA WG2 Meeting #148E S2-2109353 dated Nov. 15-22, 2021.

* cited by examiner

COMMUNICATION METHOD AND APPARATUS

CROSS-REFERENCE TO RELATED APPLICATIONS

This application is a continuation of International Application No. PCT/CN2022/071418, filed on Jan. 11, 2022, the disclosure of which is hereby incorporated by reference in its entirety.

TECHNICAL FIELD

This application relates to the field of communications technologies, and in particular, to a communication method and apparatus.

BACKGROUND

Currently, a common terminal user performs a data service by using a public network. However, in a scenario such as an office or home, for more effective and secure management, a local user or administrator may deploy a non-public network (NPN) such as a local network or a private network. The NPN may include a plurality of deployment manners, for example, may be a stand-alone non-public network (SNPN).

In a related technology, a terminal device may select an SNPN during initial access, and notify a network device of the selected SNPN. Identity authentication is performed between the terminal device and the network device by using an identity of the SNPN selected during initial access. However, when an SNPN handover occurs, if the identity of the SNPN selected by the terminal device during initial access is still used for identity authentication, a failure of identity authentication may be caused.

SUMMARY

Embodiments of this application provide a communication method and apparatus, to solve a technical problem in a conventional technology that identity authentication fails after a handover between SNPNs.

A first aspect of this application provides a communication method, where the method includes:

receiving, by a terminal device, first information sent by a network device, where the first information is used to indicate an identity of a first SNPN which the terminal device is handed over to or is to be handed over to through an SNPN handover.

In an optional implementation, after the receiving, by a terminal device, first information sent by a network device, the method further includes:

determining, by the terminal device, the identity of the first SNPN based on the first information.

In an optional implementation, the identity of the first SNPN includes an identity of a public land mobile network PLMN and a network identifier NID.

In an optional implementation, the first information includes the identity of the first SNPN.

In an optional implementation, if an identity of a PLMN corresponding to an identity of a second SNPN before the terminal device is handed over through the SNPN handover is the same as an identity of the PLMN corresponding to the identity of the first SNPN, the first information includes the network identifier NID corresponding to the identity of the first SNPN.

In an optional implementation, the determining, by the terminal device, the identity of the first SNPN based on the first information includes:

determining, by the terminal device, the identity of the first SNPN based on the NID corresponding to the identity of the first SNPN and the identity of the PLMN corresponding to the identity of the second SNPN.

In an optional implementation, the first information is carried in an SNPN handover command, and the SNPN handover command is used to instruct to hand over from the second SNPN to the first SNPN.

In an optional implementation, the first information is carried in a registration accept message or a configuration update message transmitted after the SNPN handover.

In an optional implementation, the first information is carried in a 5G globally unique temporary terminal identity GUTI or an independent information element corresponding to the identity of the first SNPN.

In an optional implementation, the 5G GUTI includes a target octet, and the target octet is used to carry the first information.

In an optional implementation, the method further includes:

sending, by the terminal device, a registration complete message or a configuration update acknowledge message to the network device, where the registration complete message or the configuration update acknowledge message is used to confirm that a 5G GUTI is valid.

In an optional implementation, the identity of the first SNPN is forwarded by an access stratum of the terminal device to a non-access stratum of the terminal device, and the non-access stratum of the terminal device is used to change a serving network name from the identity of the second SNPN to the identity of the first SNPN.

In an optional implementation, after the receiving, by a terminal device, first information sent by a network device, the method further includes:

performing, by the terminal device, identity authentication by using the identity of the first SNPN as a serving network name.

A second aspect of this application provides a communication method, where the method includes:

sending, by a network device, first information to a terminal device, where the first information is used to indicate an identity of a first stand-alone non-public network SNPN which the terminal device is handed over to or is to be handed over to through an SNPN handover.

In an optional implementation, the identity of the first SNPN includes an identity of a public land mobile network PLMN and a network identifier NID.

In an optional implementation, the first information includes the identity of the first SNPN.

In an optional implementation, if an identity of a PLMN corresponding to an identity of a second SNPN before the terminal device is handed over through the SNPN handover is the same as an identity of the PLMN corresponding to the identity of the first SNPN, the first information includes the network identifier NID corresponding to the identity of the first SNPN.

In an optional implementation, the first information is carried in an SNPN handover command, and the SNPN handover command is used to instruct to hand over from the second SNPN to the first SNPN.

In an optional implementation, the first information is carried in a registration accept message or a configuration update message transmitted after the SNPN handover.

In an optional implementation, the first information is carried in a 5G globally unique temporary terminal identity GUTI or an independent information element corresponding to the identity of the first SNPN.

In an optional implementation, the 5G GUTI includes a target octet, and the target octet is used to carry the first information.

In an optional implementation, the identity of the first SNPN is forwarded by an access stratum of the terminal device to a non-access stratum of the terminal device, and the non-access stratum of the terminal device is used to change a serving network name from the identity of the second SNPN to the identity of the first SNPN.

A third aspect of this application provides a communications apparatus, and the communications apparatus includes:

- a receiving module, configured to receive first information sent by a network device, where the first information is used to indicate an identity of a first stand-alone non-public network SNPN which the communications apparatus is handed over to or is to be handed over to through an SNPN handover.

In an optional implementation, the apparatus further includes:

- a processing module, configured to determine the identity of the first SNPN based on the first information.

In an optional implementation, the identity of the first SNPN includes an identity of a public land mobile network PLMN and a network identifier NID.

In an optional implementation, the first information includes the identity of the first SNPN.

In an optional implementation, if an identity of a PLMN corresponding to an identity of a second SNPN before the communications apparatus is handed over through the SNPN handover is the same as an identity of the PLMN corresponding to the identity of the first SNPN, the first information includes the network identifier NID corresponding to the identity of the first SNPN.

In an optional implementation, the processing module is specifically configured to determine the identity of the first SNPN based on the NID corresponding to the identity of the first SNPN and the identity of the PLMN corresponding to the identity of the second SNPN.

In an optional implementation, the first information is carried in an SNPN handover command, and the SNPN handover command is used to instruct to hand over from the second SNPN to the first SNPN.

In an optional implementation, the first information is carried in a registration accept message or a configuration update message transmitted after the SNPN handover.

In an optional implementation, the first information is carried in a 5G globally unique temporary terminal identity GUTI or an independent information element corresponding to the identity of the first SNPN.

In an optional implementation, the 5G GUTI includes a target octet, and the target octet is used to carry the first information.

In an optional implementation, the apparatus further includes:

- a sending module, configured to send a registration complete message or a configuration update acknowledge message to the network device, where the registration complete message or the configuration update acknowledge message is used to confirm that a 5G GUTI is valid.

In an optional implementation, the identity of the first SNPN is forwarded by an access stratum of the communications apparatus to a non-access stratum of the communications apparatus, and the non-access stratum of the communications apparatus is configured to change a serving network name from the identity of the second SNPN to the identity of the first SNPN.

In an optional implementation, the processing module is further configured to perform, by the communications apparatus, identity authentication by using the identity of the first SNPN as the serving network name.

A fourth aspect of this application provides a communications apparatus, and the communications apparatus includes:

- a sending module, configured to send first information to a terminal device, where the first information is used to indicate an identity of a first stand-alone non-public network SNPN which the terminal device is handed over to or is to be handed over to through an SNPN handover.

In an optional implementation, the identity of the first SNPN includes an identity of a public land mobile network PLMN and a network identifier NID.

In an optional implementation, the first information includes the identity of the first SNPN.

In an optional implementation, if an identity of a PLMN corresponding to an identity of a second SNPN before the terminal device is handed over through the SNPN handover is the same as an identity of the PLMN corresponding to the identity of the first SNPN, the first information includes the network identifier NID corresponding to the identity of the first SNPN.

In an optional implementation, the first information is carried in an SNPN handover command, and the SNPN handover command is used to instruct to hand over from the second SNPN to the first SNPN.

In an optional implementation, the first information is carried in a registration accept message or a configuration update message transmitted after the SNPN handover.

In an optional implementation, the first information is carried in a 5G globally unique temporary terminal identity GUTI or an independent information element corresponding to the identity of the first SNPN.

In an optional implementation, the 5G GUTI includes a target octet, and the target octet is used to carry the first information.

In an optional implementation, the identity of the first SNPN is forwarded by an access stratum of the terminal device to a non-access stratum of the terminal device, and the non-access stratum of the terminal device is used to change a serving network name from the identity of the second SNPN to the identity of the first SNPN.

A fifth aspect of this application provides a terminal device, including:

- a processor, a memory, a receiver, and an interface for communicating with a network device.

The memory stores computer execution instructions.

The processor executes the computer execution instructions stored in the memory to cause the processor to perform the communication method according to the first aspect.

A sixth aspect of this application provides a network device, including:

- a processor, a memory, a transmitter, and an interface for communicating with a terminal device.

The memory stores computer execution instructions.

The processor executes the computer execution instructions stored in the memory to cause the processor to perform the communication method according to the second aspect.

A seventh aspect of this application provides a chip, including a processor configured to invoke a computer program from the memory and run the computer program, to cause a device installed with the chip to perform the method according to the first aspect.

An eighth aspect of this application provides a chip, including a processor configured to invoke a computer program from the memory and run the computer program, to cause a device installed with the chip to perform the method according to the second aspect.

A ninth aspect of this application provides a computer-readable storage medium, configured to store a computer program, and the computer program causes a computer to perform the method according to the first aspect.

A tenth aspect of this application provides a computer-readable storage medium, configured to store a computer program, and the computer program causes a computer to perform the method according to the second aspect.

An eleventh aspect of this application provides a computer program product, including computer instructions, where the computer instructions are executed by a processor to implement the method according to the first aspect.

A twelfth aspect of this application provides a computer program product, including computer instructions, where the computer instructions are executed by a processor to implement the method according to the second aspect.

A thirteenth aspect of this application provides a computer program, where the computer program causes a computer to perform the method according to the first aspect.

A fourteenth aspect of this application provides a computer program, where the computer program causes a computer to perform the method according to the second aspect.

A fifteenth aspect of this application provides an apparatus, where the apparatus may include at least one processor and an interface circuit, and related program instructions are executed in the at least one processor, to cause the apparatus to implement the method according to the first aspect.

A sixteenth aspect of this application provides an apparatus, where the apparatus may include at least one processor and an interface circuit, and related program instructions are executed in the at least one processor, to cause the apparatus to implement the method according to the second aspect.

A seventeenth aspect of this application provides a communications apparatus, where the apparatus is configured to perform the method according to the first aspect.

An eighteenth aspect of this application provides a communications apparatus, where the apparatus is configured to perform the method according to the second aspect.

According to the communication method and apparatus provided in the embodiments of this application, a terminal device receives first information sent by a network device, where the first information is used to indicate an identity of a first stand-alone non-public network SNPN which the terminal device is handed over to through an SNPN handover. In this manner, during the SNPN handover or after the SNPN handover, the terminal device is notified of the identity of the first SNPN selected by a network device side, so that both the terminal device and the network device use the identity of the first SNPN as a serving network name, thereby avoiding a failure of identity authentication due to different derived security parameters caused by inconsistency of serving network names, preventing the network device from releasing a connection with the terminal device, and improving user experience.

BRIEF DESCRIPTION OF DRAWINGS

To describe the technical solutions in the present invention or a conventional technology more clearly, the following briefly describes the accompanying drawings required for describing the embodiments or the conventional technology. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1:
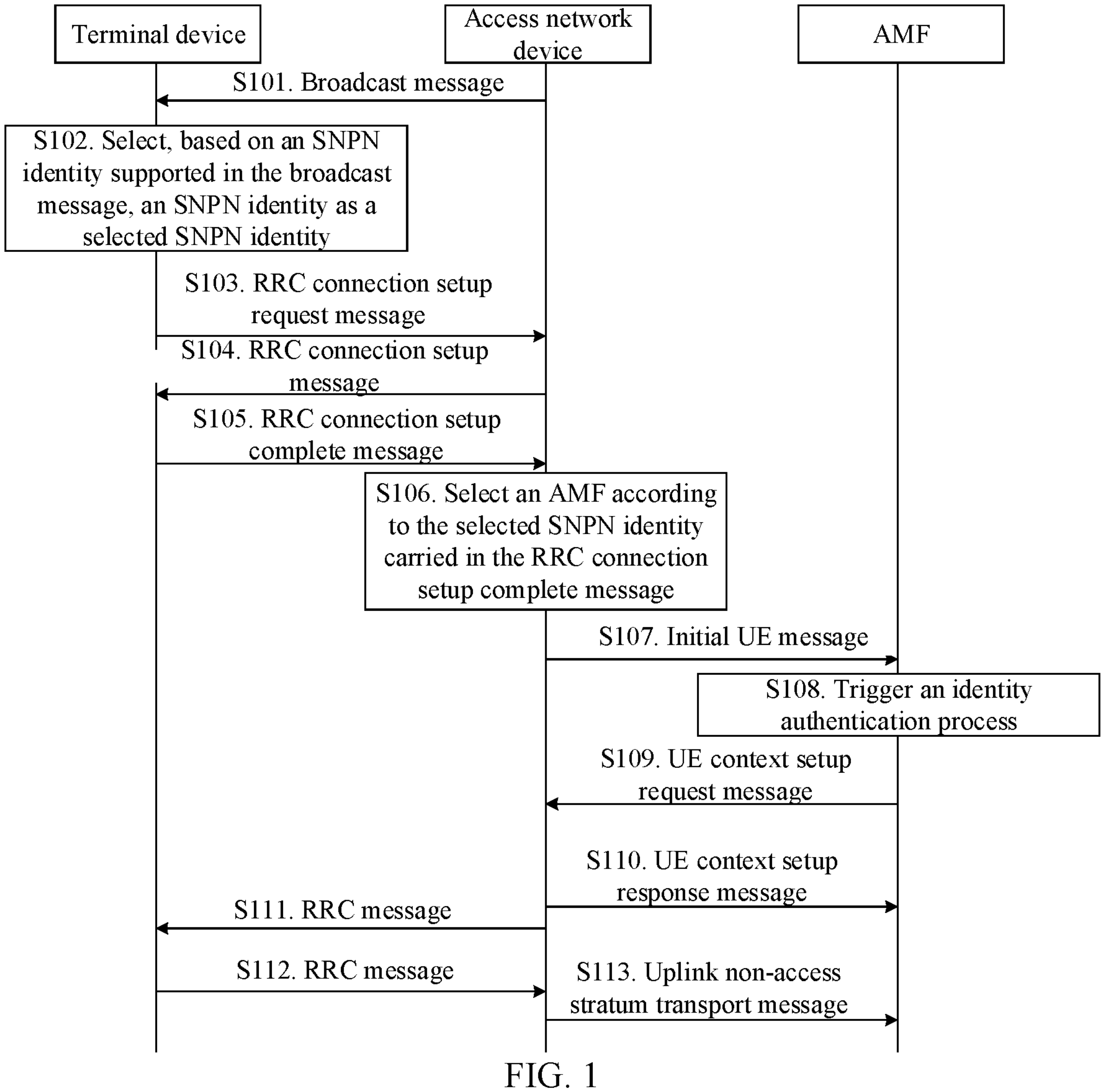
FIG. 1 is a schematic flowchart of selecting an SNPN by a terminal device in a conventional technology.

To make the objectives, technical solutions, and advantages of the present invention clearer, the following clearly and completely describes the technical solutions in the embodiments of the present invention with reference to the accompanying drawings in the embodiments of the present invention. Apparently, the described embodiments are some rather than all of the embodiments of the present invention. All other embodiments obtained by persons of ordinary skill in the art based on the embodiments of the present invention without creative efforts fall within the protection scope of the present invention.

In this specification, claims, and accompanying drawings of embodiments in this application, the terms “first”, “second”, and so on are intended to distinguish between similar objects but do not necessarily indicate a specific order or sequence. It should be understood that the data used in this way may be interchangeable under appropriate circumstances such that the embodiments in this application described herein are, for example, capable of being implemented in an order different from that illustrated or described herein. In addition, the terms “include” and “have” and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such process, method, product, or device.

It should be understood that the terms "system" and "network" in this specification may often be used interchangeably. In this specification, the term "and/or" is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects.

The following describes the technical solutions in the embodiments of this application with reference to the accompanying drawings in the embodiments of this application. Apparently, the described embodiments are some rather than all of the embodiments of this application. All other embodiments obtained by persons of ordinary skill in the art based on the embodiments of this application without creative efforts fall within the protection scope of this application.

Currently, a common terminal user performs a data service by using a public network. However, in a scenario such as an office or home, for more effective and secure management, a local user or administrator may deploy a non-public network (NPN) such as a local network or a private network. The NPN may include a plurality of deployment manners, for example, may be a stand-alone non-public network (SNPN).

The public network may be a public land mobile network (PLMN).

It should be understood that network elements in the NPN may exist independently of the PLMN, that is, the NPN implements isolation from the PLMN through its own network elements such as a policy control function (PCF) network element, a session management function (SMF) network element, an access and mobility management function (AMF) network element, and a unified data management (UDM) network element, and also through its own root key, security algorithm, subscription information, policy information, and the like. When a terminal device performs initial access, the terminal device selects an SNPN, and notifies a network device of the selected SNPN.

For example, FIG. 1 is a schematic flowchart of selecting an SNPN by a terminal device in a conventional technology. As shown in FIG. 1, a procedure of selecting an SNPN by the terminal device includes step S101 to step S111.

S101. An access network device sends a broadcast message, where the message includes an SNPN identity that is supported.

A format of the SNPN identity may be PLMN ID+NPN ID.

S102. The terminal device selects, based on the SNPN identity supported in the broadcast message, an SNPN identity as a selected SNPN identity.

S103. The terminal device sends a radio resource control (RRC) connection setup request message to the access network device.

The RRC connection setup request message carries a serving-temporary mobile subscriber identity (S-TMSI) and an RRC setup cause value.

S104. The access network device returns an RRC connection setup message to the terminal device.

S105. The terminal device sends an RRC connection setup complete message to the access network device.

The RRC connection setup complete message carries the selected SNPN identity and a non-access stratum (NAS) information element (container). The NAS container includes a NAS message, such as a registration request message, and the registration request message carries an identity of the terminal device. The identity of the terminal device may include information such as a 5G globally unique temporary UE identity (5G GUTI), a subscription concealed identifier (SUCI) (when there is no 5G GUTI for the terminal device), a security capability of the terminal device, a requested network slice (Network Slice Selection Assistance Information, NSSAI), and a tracking area identity (TAI) used in last registration.

S106. The access network device selects an AMF according to the selected SNPN identity carried in the RRC connection setup complete message.

S107. The access network device sends an initial UE message to the selected AMF.

The Initial UE message carries the NAS container, the RRC setup cause value, location information of the terminal device, and the selected SNPN identity. The location information of the terminal device includes a PLMN ID, a cell identity, and a tracking area code (TAC).

S108. The AMF triggers an identity authentication process.

It should be understood that, in the authentication process, a serving network name used by both the terminal device and a network device is the selected SNPN identity. In the authentication process, the terminal device and the network device need to use the serving network name to derive a security parameter (for example, KAUSF and RES*).

S109. The AMF returns a UE context setup request message to the access network device, where the message includes a registration accept message, a security parameter, allowed NSSAI, and a 5G short temporary mobile subscriber identity (5G-S-TMSI) carried in the NAS container. The registration accept message carries parameters such as the allowed NSSAI, a TAI list and the 5G GUTI.

S110. The access network device returns a UE context setup response message to the AMF.

S111. The access network device sends an RRC message to the terminal device, where the RRC message includes the foregoing NAS container.

S112. The terminal device sends an RRC message to the access network device, where the RRC message is used to send a NAS container, the NAS container includes a registration complete message, and the registration complete message is used to confirm that the 5G GUTI is valid.

S113. The access network device sends an uplink non-access stratum transport (Uplink NAS Transport) message to the AMF, where the message carries the NAS container.

In a related technology, when a network handover occurs only in a current SNPN network, a serving network name does not change, and the terminal device and the network device still use an identity of an SNPN selected by the terminal device during initial access for identity authentication.

For example, when a network handover occurs, a source access network device may send a handover request to a source AMF, where the handover request includes a target identity, and the target identity includes an identity of a target PLMN after the handover.

For example, when a network handover occurs, after completing the handover, the terminal device may send a registration message to an AMF in a target cell, where the registration message includes parameters such as a 5G GUTI, and the AMF returns a new 5G GUTI to the terminal device.

It should be understood that if the terminal device uses a PLMN network and a handover process occurs, the following two manners are used when the terminal device and the network device derive a security parameter by using a serving network name used in an authentication process.

Manner 1: If a target cell is not a shared network cell, the terminal device uses a PLMN ID in a system broadcast message as the serving network name.

Manner 2: If the target cell is a shared network cell and the terminal device has a valid 5G GUTI, the terminal device uses the PLMN ID part in the 5G GUTI as the serving network name.

On such a basis, in the related technology, even if the access network device selects a new PLMN ID to serve the terminal device, the terminal device can learn the new PLMN ID immediately, and can use the new PLMN ID as the serving network name.

It should be noted that an SNPN may be identified by using a combination of a PLMN ID and a network identifier (NID). Different SNPNs may have a same PLMN ID and different NIDs. Thus, a current registered SNPN ID cannot be accurately represented by using a PLMN ID in a 5G GUTI (the format is as follows: <5G GUTI>=<MCC><MNC><AMF Identifier><5G-TMSI>, where <AMF Identifier>=<AMF Region ID><AMF Set ID><AMF Pointer>).

However, when an SNPN handover occurs, if the identity of the SNPN selected by the terminal device during initial access is still used for identity authentication, a failure of identity authentication may be caused.

To solve the foregoing problem, embodiments of this application provide a communication method and apparatus. A network device sends first information to a terminal device, and the first information indicates an identity of a first SNPN which the terminal device is handed over to through an SNPN handover. In this manner, during the SNPN handover or after the SNPN handover, the terminal device is notified of the identity of the first SNPN selected by a network device side, so that both the terminal device and the network device use the identity of the first SNPN as a serving network name, thereby avoiding a failure of identity authentication due to different derived security parameters caused by inconsistency of serving network names, preventing the network device from releasing a connection with the terminal device, and improving user experience.

The following uses an example to describe an application scenario of this application.

Figure 2:
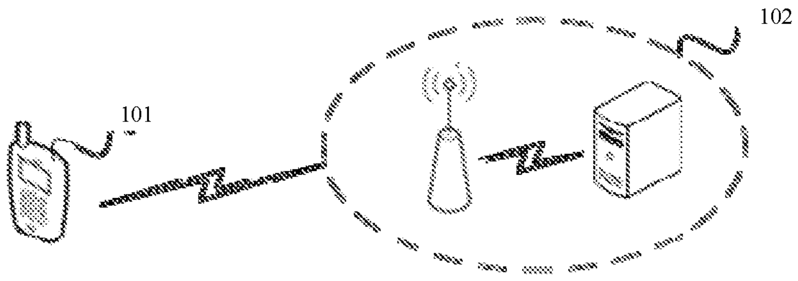
FIG. 2 is a schematic diagram of a scenario of a communication method according to an embodiment of this application.

FIG. 2 is a schematic diagram of a scenario of a communication method according to an embodiment of this application. As shown in FIG. 2, a terminal device 101 communicates with a network device 102. In a process of an SNPN handover or after the SNPN handover performed by the terminal device 101, the network device 102 sends a first information to the terminal device, and the first information indicates an identity of a first SNPN which the terminal device is handed over to or is to be handed over to through the SNPN handover.

The terminal device 101 includes, but is not limited to, a satellite or cellular phone, and a personal communications system (PCS) terminal that may combine a cellular wireless phone with data processing, fax, and data communication capability; a PDA that may include a wireless phone, a pager, Internet/Intranet access, a web browser, a notebook, a calendar, and/or a global positioning system (GPS) receiver; and a conventional laptop and/or palmtop receiver or another electronic apparatus including a wireless telephone transceiver. The terminal device may be an access terminal, a user equipment (UE), a subscriber unit, a subscriber station, a mobile site, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved PLMN, or the like.

The network device 102 may be an access network device, or may be a core network device. If the network device 102 is an access network device, the network device 102 may provide communication coverage for a specific geographic area, and may communicate with a terminal device located within the coverage. Optionally, the network device 102 may be a base transceiver station (BTS) in a GSM system or a CDMA system, may be a NodeB (NB) in a WCDMA system, or may be an evolved Node B (eNB or eNodeB) in an LTE system, or a radio controller in a cloud radio access network (CRAN). The network device may alternatively be a mobile switching center, a relay station, an access point, a vehicle-mounted device, a wearable device, a hub, a switch, a bridge, a router, a network device in a 5G network, a network device in a public land mobile network (PLMN), or the like. If the network device 102 is a core network device, the network device 102 may include various types of networks, such as an AMF, a PCF, and an SMF.

The following uses a communications device such as a terminal device or a network device as an example to describe the technical solutions in the embodiments of this application in detail. The following specific embodiments may be combined with each other. For a same or similar concept or process, details may not be described in some embodiments.

Figure 3:
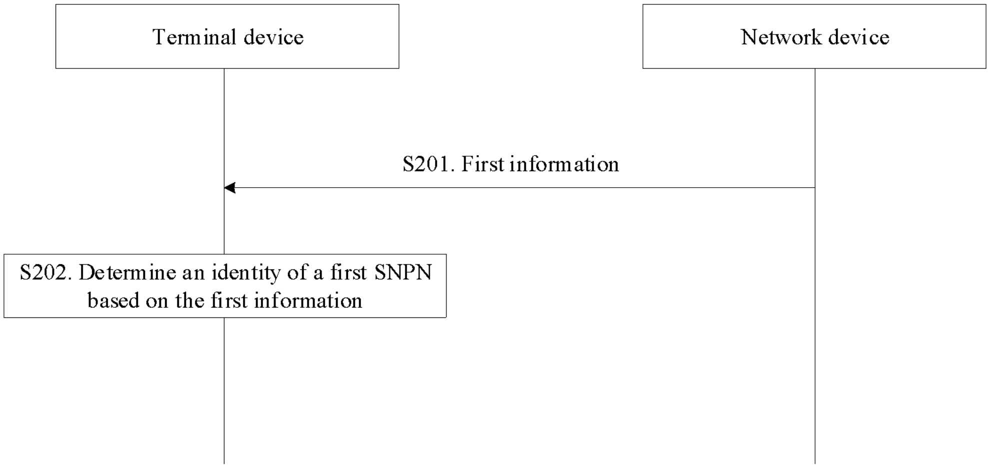
FIG. 3 is a signaling interaction diagram of a communication method according to an embodiment of this application.

FIG. 3 is a signaling interaction diagram of a communication method according to an embodiment of this application. This embodiment relates to a process of how a terminal device determines an identify of a first SNPN after an SNPN handover. As shown in FIG. 3, the method includes the following steps.

S201. A network device sends first information to a terminal device, where the first information is used to indicate an identity of a first stand-alone non-public network SNPN which the terminal device is handed over to or is to be handed over to through an SNPN handover.

In this application, when the terminal device performs the SNPN handover or completes the SNPN handover, the network device may send the first information to the terminal device, and the first information indicates the identity of the first SNPN which the terminal device is handed over to or is to be handed over to through the SNPN handover.

It should be understood that in this application, a second SNPN may be an SNPN before a handover, and the first SNPN may be an SNPN after a handover or an SNPN to be handing over.

In some embodiments, the identity of the first SNPN may include an identity of a public land mobile network (PLMN) and a network identifier (NID).

It should be understood that how the first information indicates the identity of the first SNPN is not limited in embodiments of this application. In some embodiments, the first information may directly include the identity of the first SNPN. In some other embodiments, if an identity of a PLMN corresponding to an identity of the second SNPN before the terminal device is handed over through the SNPN handover is the same as an identity of the PLMN corresponding to the identity of the first SNPN, the first information includes the NID corresponding to the first SNPN.

The identity of the PLMN corresponding to the identity of the second SNPN is used to form the identity of the first SNPN with an identity of a PLMN corresponding to the second SNPN. Correspondingly, after receiving the first information, the terminal device may determine the identity of the first SNPN based on the NID corresponding to the identity of the first SNPN and the identity of the PLMN corresponding to the identity of the second SNPN.

For example, after receiving the first information, the terminal device may obtain the identity of the first SNPN through combination in a manner of PLMN ID+NID.

It should be understood that, how the network device sends the first information to the terminal device is not limited in embodiments of this application. The following provides two available manners in which the network device sends the first information.

Manner 1: The first information is carried in an SNPN handover command, and the SNPN handover command is used to instruct to hand over from the second SNPN to the first SNPN.

For example, an access network device (source NG-RAN) may send an identity of a selected first SNPN to the terminal device by using a handover command, and the identity of the first SNPN may be included in an existing target identity (target ID). Optionally, the first information may be added to the handover command in a manner of adding an information element.

Manner 2: The first information is carried in a registration accept message or a configuration update message transmitted after the SNPN handover.

In some embodiments, the terminal device may send a registration request message to a core network device (AMF) by using the access network device, where the registration request message includes parameters such as a 5G GUTI, a security capability of the terminal device, and requested NSSAI. Then, the core network device (AMF) returns a registration accept message to the terminal device, where the registration accept message includes a new 5G GUTI and the foregoing first information. Next, the terminal device may return a registration complete message to the core network device (AMF), where the registration complete message or a configuration update acknowledgment message is used to confirm that the 5G GUTI is valid.

In some other embodiments, after the handover is completed, the core network device (AMF) may send a configuration update (UE configuration Update Command) message to the terminal device, where the configuration update message may include a new 5G GUTI, a registered SNPN ID, or an NID (namely, the first information). Then, the terminal device returns a configuration update acknowledgment (UE configuration update ACK) message to the core network device (AMF), where the configuration update acknowledgment message includes the identity of the first SNPN.

The first information may be specifically carried in the 5G GUTI or an independent information element corresponding to the identity of the first SNPN. The 5G GUTI includes a target octet, and the target octet is used to carry the first information.

For example, Table 1 is a schematic table in which an octet is added to carry the first information. As shown in Table 1, an octet 15 may be added at the end of the original 5G GUTI format, so that the NID or the identity of the first SNPN is added to the Octet 15.

TABLE 1

| | |
|---|---|
| 5GS mobile identity information element identifier (5GS mobile identity IEI) | Octet 1 |
| . . . | . . . |
| 5G-TMSI continued | Octet 12 |
| 5G-TMSI continued | Octet 13 |
| 5G-TMSI continued | Octet 14 |
| NID | Octet 15 |

S202. The terminal device determines the identity of the first SNPN based on the first information.

In this step, after receiving the first information sent by the network device, the terminal device may determine the identity of the first SNPN based on the first information.

It should be understood that how to determine the identity of the first SNPN is not limited in embodiments of this application. In some embodiments, if the first information directly includes the identity of the first SNPN, correspondingly, the terminal device may directly obtain the identity of the first SNPN from the first information. In some other embodiments, when the identity of the PLMN corresponding to the identity of the second SNPN before the terminal device is handed over through the SNPN handover is the same as the identity of the PLMN corresponding to the identity of the first SNPN, the first information may include only an NID corresponding to the identity of the first SNPN. Correspondingly, the terminal device may combine the identity of the PLMN corresponding to the second SNPN and the NID corresponding to the identity of the first SNPN in the first information into the identity of the first SNPN.

In some embodiments, the identity of the first SNPN is forwarded by an access stratum of the terminal device to a non-access stratum of the terminal device, and the non-access stratum of the terminal device is used to change a serving network name from the identity of the second SNPN to the identity of the first SNPN.

For example, after receiving the identity of the first SNPN, the access stratum (AS) of the terminal device may forward the identity of the first SNPN to the NAS of the terminal device, and the NAS of the terminal device may use the identity of the first SNPN as a registered identity of the SNPN, that is, change the serving network name from the identity of the second SNPN to the identity of the first SNPN. Correspondingly, if the AS forwards only the NID, after the AS forwards the NID to the NAS, the NAS may add the NID to the identity of the first SNPN, and then use the identity of the first SNPN as the registered identity of the SNPN.

In some embodiments, after receiving the first information, the terminal device may further use the identity of the first SNPN as the serving network name for identity authentication.

According to the communication method provided in the embodiments of this application, a terminal device receives first information sent by a network device, where the first information is used to indicate an identity of a first standalone non-public network SNPN which the terminal device is handed over to through an SNPN handover. In this manner, during the SNPN handover or after the SNPN handover, the terminal device is notified of the identity of the first SNPN selected by a network device side, so that both the terminal device and the network device use the identity of the first SNPN as a serving network name, thereby avoiding a failure of identity authentication due to different derived security parameters caused by inconsistency of serving network names, preventing the network device from releasing a connection with the terminal device, and improving user experience.

Figure 4:
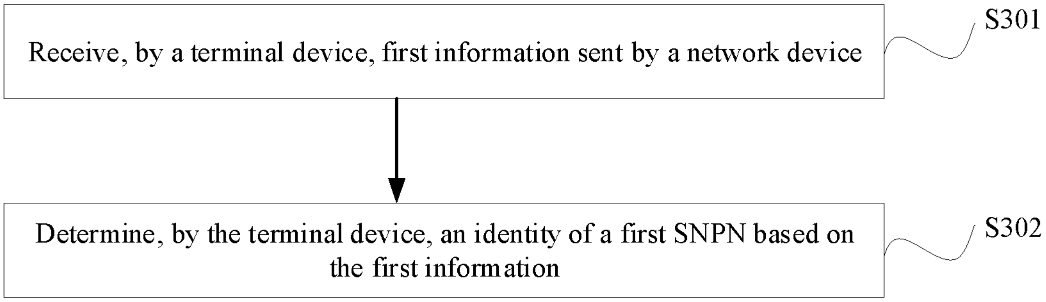
FIG. 4 is a schematic flowchart of a communication method according to an embodiment of this application.

On the basis of the foregoing embodiments, the following describes a communication method performed on a terminal device side. FIG. 4 is a schematic flowchart of a communication method according to an embodiment of this application. This embodiment is executed by a terminal device. The communication method includes:

S301. receiving, by the terminal device, first information sent by a network device, where the first information is used to indicate an identity of a first stand-alone non-public network SNPN which the terminal device is handed over to or is to be handed over to through an SNPN handover; and S302. determining, by the terminal device, the identity of the first SNPN based on the first information.

For technical terms, technical effects, technical features, and optional implementations in steps S301 and S302, reference may be made to understanding of S201 and S202 shown in FIG. 3. Repeated content is not described herein again.

Figure 5:
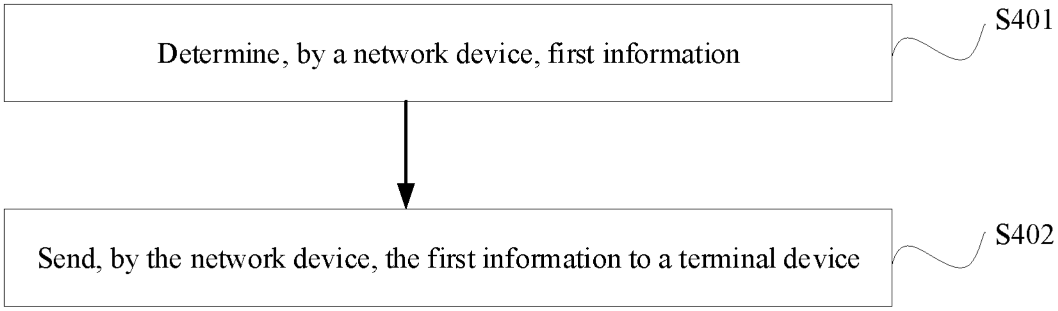
FIG. 5 is a schematic flowchart of another communication method according to an embodiment of this application.

Based on the foregoing embodiments, the following describes a communication method performed on a network device side. FIG. 5 is a schematic flowchart of another communication method according to an embodiment of this application. This embodiment is executed by a network device. The communication method includes:

S401. determining, by the network device, first information, where the first information is used to indicate an identity of a first stand-alone non-public network SNPN which the terminal device is handed over to or is to be handed over to through an SNPN handover; and S402. sending, by the network device, the first information to a terminal device.

For technical terms, technical effects, technical features, and optional implementations in steps S401 and S402, reference may be made to understanding of S201 and S202 shown in FIG. 3. Repeated content is not described herein again.

Based on the foregoing embodiments, the following separately describes manners in which the network device sends the first information.

Figure 6:
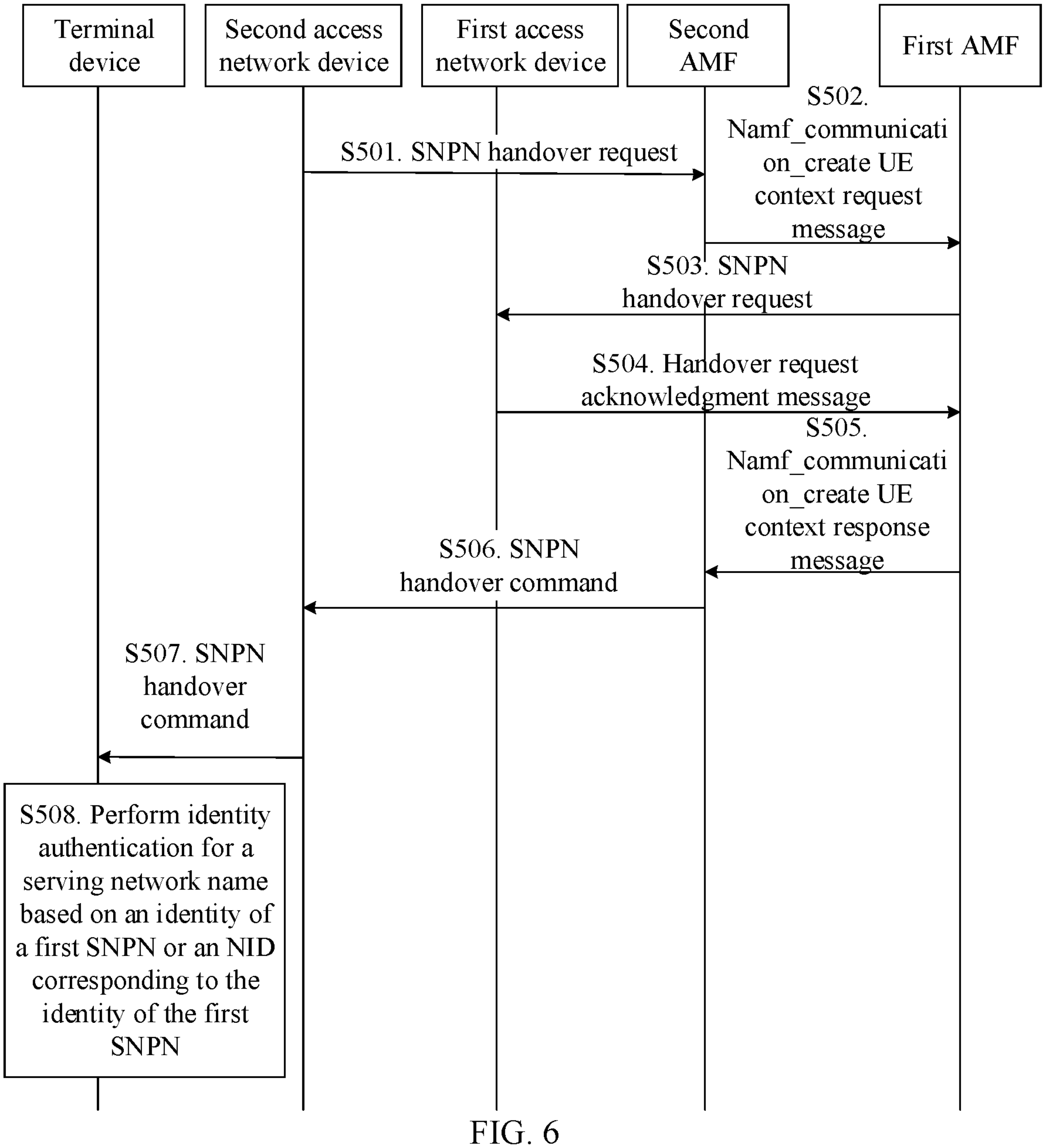
FIG. 6 is a signaling interaction diagram of another communication method according to an embodiment of this application.

FIG. 6 is a signaling interaction diagram of another communication method according to an embodiment of this application. The embodiment of this application relates to a case in which the first information is carried in an SNPN handover command. As shown in FIG. 6, the method includes the following steps.

S501. A second access network device sends an SNPN handover request to a second AMF.

The SNPN handover request includes a target identity, and the target identity includes the identity of the first SNPN handing over to or is to be handing over to through a handover.

S502. The second AMF sends a Namf_communication_create UE context request message (Namf_Communication_Create UE Context Request) to a first AMF.

The first AMF is an AMF corresponding to the first SNPN.

S503. The first AMF sends an SNPN handover request to a first access network device.

The first access network device is an access network device corresponding to the first SNPN.

S504. The first access network device sends a handover request acknowledgment (Handover Request ACK) message to the first AMF.

The handover request acknowledgment message includes a target to source information element (target to source container), and the information element includes the identity of the first SNPN. If PLMN ID parts in a second SNPN ID and a first SNPN ID are the same, the information element may carry only an NID corresponding to the identity of the first SNPN.

S505. The first AMF sends a Namf_communication_create UE context response message (Namf_Communication_Create UE Context Response) to the second AMF.

S506. The second AMF sends an SNPN handover command to the second access network device, where the SNPN handover command is used to instruct to hand over from the second SNPN to the first SNPN.

S507. The second access network device sends an SNPN handover command to a terminal device.

The SNPN handover command includes an information element, and the SNPN handover command includes the identity of the first SNPN or the NID.

S508. The terminal device performs identity authentication for a serving network name based on the identity of the first SNPN or the NID corresponding to the identity of the first SNPN.

In some embodiments, after receiving the identity of the first SNPN or the NID, an AS of the terminal device may forward the identity of the first SNPN or the NID to a NAS. The NAS directly registers the identity of the first SNPN as an SNPN ID. The NAS may add the NID to the SNPN ID (SNPN ID is a combination of a PLMN ID and the NID), and then register the SNPN ID as an SNPN ID, that is, change the serving network name from an identity of the second SNPN to the identity of the first SNPN.

Figure 7:
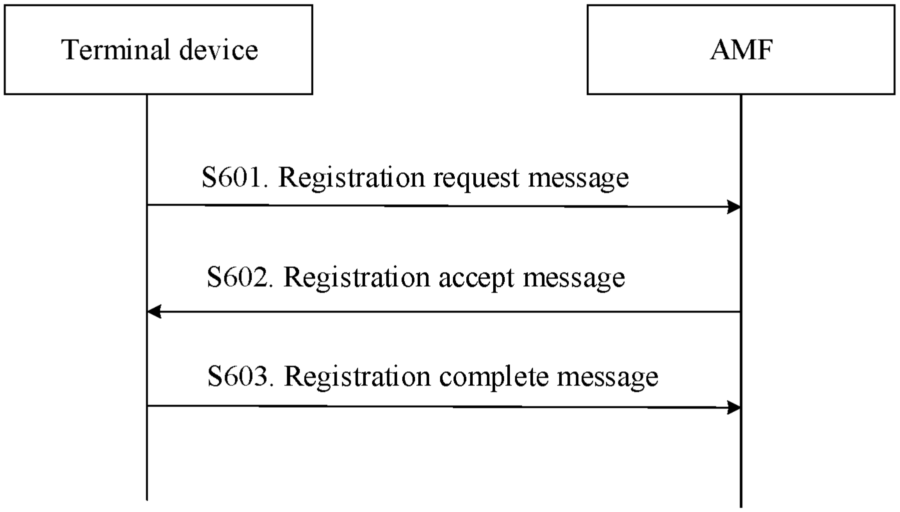
FIG. 7 is a signaling interaction diagram of still another communication method according to an embodiment of this application.

FIG. 7 is a signaling interaction diagram of still another communication method according to an embodiment of this application. This embodiment of this application relates to a case in which the first information is carried in a registration accept message transmitted after the handover. As shown in FIG. 7, the method includes the following steps.

S601. A terminal device sends a registration request message to an AMF.

The registration request message includes parameters such as a 5G GUTI, a security capability of the terminal device, and requested NSSAI.

S602. The AMF sends a registration accept message to the terminal device.

The registration accept message includes the 5G GUTI and first information (which may be a first SNPN or may be an NID).

It should be understood that the first information may be separately stored in an information element, or may be stored in the 5G GUTI, where the 5G GUTI includes a target octet, and the target octet is used to carry the first information.

S603. The terminal device returns a registration complete message to the AMF, where the registration complete message is used to determine that the 5G GUTI is valid.

It should be noted that network devices such as the AMF and the access network device in this embodiment may be network devices corresponding to a first SNPN handing over to or to be handing over to through the handover, namely, the first AMF and the first access network device in FIG. 6.

Figure 8:
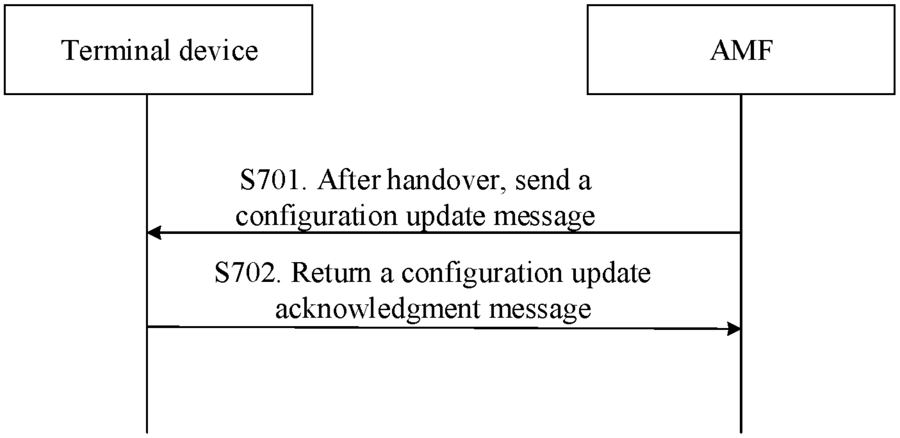
FIG. 8 is a signaling interaction diagram of yet another communication method according to an embodiment of this application.

FIG. 8 is a signaling interaction diagram of yet another communication method according to an embodiment of this application. The embodiment of this application relates to a case in which the first information is carried in a configuration update message transmitted after a handover. As shown in FIG. 8, the method includes the following steps.

S701. After the handover, an AMF sends a configuration update message to a terminal device.

The configuration update message includes a 5G GUTI and a first information (which may be a first SNPN or may be an NID).

It should be understood that the first information may be separately stored in an information element, or may be stored in the 5G GUTI, where the 5G GUTI includes a target octet, and the target octet is used to carry the first information.

S702. The terminal device returns a configuration update acknowledgment message to the AMF, where the configuration update acknowledgment message is used to confirm that the 5G GUTI is valid.

It should be noted that network devices such as the AMF and the access network device in this embodiment may be network devices corresponding to a first SNPN handed over to or to be handed over to through the handover, namely, the first AMF and the first access network device in FIG. 6.

In this application, in a handover process or after a handover process, the terminal device is notified, in a timely manner, of the identity of the first SNPN selected by a network side, to avoid a failure in a subsequent identity authentication process, thereby preventing the network side from unnecessarily releasing a connection with the terminal device, and ensuring user experience and continuity of a user service to some extent. Unnecessarily releasing a connection with a user is avoided, so that additional signaling required for another access of a terminal is reduced, thereby reducing air interface signaling to some extent.

Figure 9:
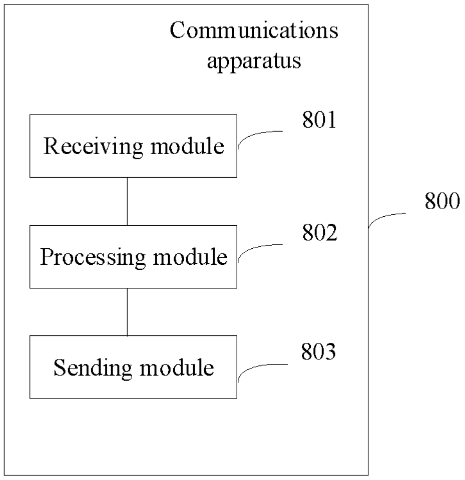
FIG. 9 is a schematic structural diagram of a communications apparatus according to an embodiment of this application.

FIG. 9 is a schematic structural diagram of a communications apparatus according to an embodiment of this application. The communications apparatus may be implemented by using software, hardware, or a combination thereof, so as to perform the communication method on a terminal device side in the foregoing embodiments. The communications apparatus may be the foregoing terminal device. As shown in FIG. 9, the communications apparatus 800 includes a receiving module 801, a processing module 802, and a sending module 803.

The receiving module 801 is configured to receive first information sent by a network device, where the first information is used to indicate an identity of a first stand-alone non-public network SNPN which the communications apparatus is handed over to or is to be handed over to through an SNPN handover.

In an optional implementation, the apparatus further includes:

the processing module 802, configured to determine the identity of the first SNPN based on the first information.

In an optional implementation, the identity of the first SNPN includes an identity of a public land mobile network PLMN and a network identifier NID.

In an optional implementation, the first information includes the identity of the first SNPN.

In an optional implementation, if an identity of a PLMN corresponding to an identity of a second SNPN before the communications apparatus is handed over through the SNPN handover is the same as an identity of the PLMN corresponding to the identity of the first SNPN, the first information includes the network identifier NID corresponding to the identity of the first SNPN.

In an optional implementation, the processing module 802 is specifically configured to determine the identity of the first SNPN based on the NID corresponding to the identity of the first SNPN and the identity of the PLMN corresponding to the identity of the second SNPN.

In an optional implementation, the first information is carried in an SNPN handover command, and the SNPN handover command is used to instruct to hand over from the second SNPN to the first SNPN.

In an optional implementation, the first information is carried in a registration accept message or a configuration update message transmitted after the SNPN handover.

In an optional implementation, the first information is carried in a 5G globally unique temporary terminal identity GUTI or an independent information element corresponding to the identity of the first SNPN.

In an optional implementation, the 5G GUTI includes a target octet, and the target octet is used to carry the first information.

In an optional implementation, the apparatus further includes:

the sending module 803, configured to send a registration complete message or a configuration update acknowledge message to the network device, where the registration complete message or the configuration update acknowledge message is used to confirm that a 5G GUTI is valid.

In an optional implementation, the identity of the first SNPN is forwarded by an access stratum of the communications apparatus to a non-access stratum of the communications apparatus, and the non-access stratum of the communications apparatus is configured to change a serving network name from the identity of the second SNPN to the identity of the first SNPN.

In an optional implementation, the processing module 802 is further configured to perform, by the communications apparatus, identity authentication by using the identity of the first SNPN as the serving network name.

The communications apparatus provided in this embodiment of this application may perform actions in the communication method on the terminal device side in the foregoing embodiments. Implementation principles and technical effects thereof are similar, and details are not described herein again.

Figure 10:
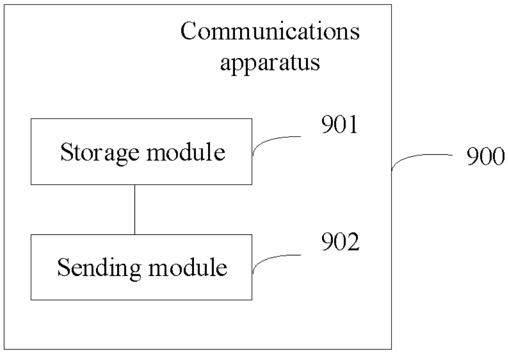
FIG. 10 is a schematic structural diagram of another communications apparatus according to an embodiment of this application.

FIG. 10 is a schematic structural diagram of another communications apparatus according to an embodiment of this application. The communications apparatus may be implemented by using software, hardware, or a combination thereof, so as to perform the communication method on a network device side in the foregoing embodiments. The communications apparatus may be the foregoing network device. As shown in FIG. 10, the communications apparatus 900 includes a storage module 901 and a sending module 902.

The storage module 901 is configured to store an executable program.

The sending module 902 is configured to send first information to a terminal device, where the first information is used to indicate an identity of a first stand-alone non-public network SNPN which the terminal device is handed over to or is to be handed over to through an SNPN handover.

In an optional implementation, the identity of the first SNPN includes an identity of a public land mobile network PLMN and a network identifier NID.

In an optional implementation, the first information includes the identity of the first SNPN.

In an optional implementation, if an identity of a PLMN corresponding to an identity of a second SNPN before the terminal device is handed over through the SNPN handover is the same as an identity of the PLMN corresponding to the identity of the first SNPN, the first information includes the network identifier NID corresponding to the identity of the first SNPN.

In an optional implementation, the first information is carried in an SNPN handover command, and the SNPN handover command is used to instruct to hand over from the second SNPN to the first SNPN.

In an optional implementation, the first information is carried in a registration accept message or a configuration update message transmitted after the SNPN handover.

In an optional implementation, the first information is carried in a 5G globally unique temporary terminal identity GUTI or an independent information element corresponding to the identity of the first SNPN.

In an optional implementation, the 5G GUTI includes a target octet, and the target octet is used to carry the first information.

In an optional implementation, the identity of the first SNPN is forwarded by an access stratum of the terminal device to a non-access stratum of the terminal device, and the non-access stratum of the terminal device is used to change a serving network name from the identity of the second SNPN to the identity of the first SNPN.

The communications apparatus provided in this embodiment of this application may perform actions in the communication method on the network device side in the foregoing embodiments. Implementation principles and technical effects thereof are similar, and details are not described herein again.

Figure 11:
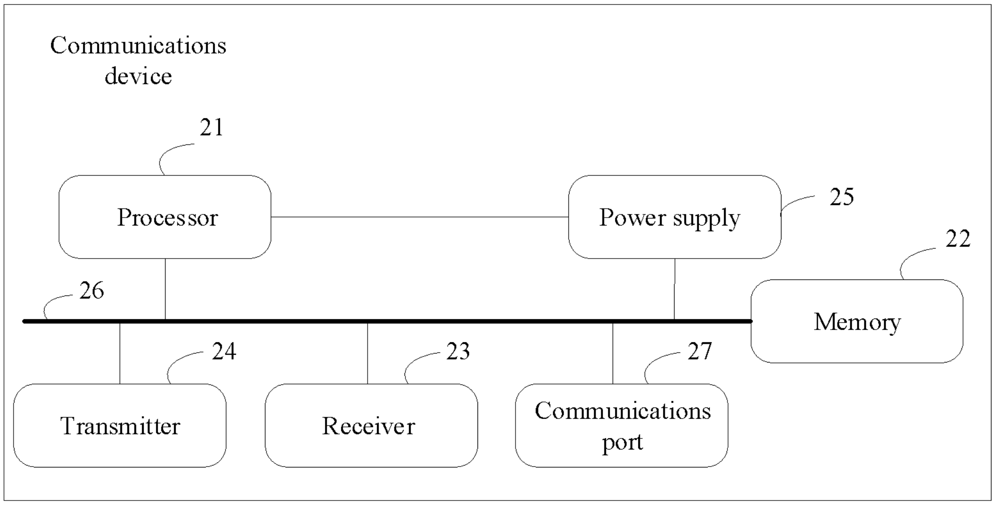
FIG. 11 is a schematic structural diagram of a communications device according to an embodiment of this application.

FIG. 11 is a schematic structural diagram of a communications device according to an embodiment of this application. As shown in FIG. 11, the electronic device may include a processor 21 (for example, a CPU), a memory 22, a receiver 23, and a transmitter 24. The receiver 23 and the transmitter 24 are coupled to the processor 21. The processor 21 controls a receiving action of the receiver 23 and a sending action of the transmitter 24. The memory 22 may include a high-speed RAM memory, and may further include a non-volatile memory NVM, for example, at least one disk memory. The memory 22 may store various types of information for completing various processing functions and implement the method steps in embodiments of this application. Optionally, the electronic device in this embodiment of this application may further include a power supply 25, a communications bus 26, and a communications port 27. The receiver 23 and the transmitter 24 may be integrated into a transceiver of the electronic device, or may be an independent transceiver antenna of the electronic device. The communications bus 26 is configured to implement a communication connection between elements. The communications port 27 is configured to implement connection and communication between the electronic device and another peripheral device.

In this embodiment of this application, the memory 22 is configured to store computer-executable program code, where the program code includes information. When the processor 21 executes the information, the information causes the processor 21 to perform a processing action on the terminal device side in the foregoing method embodiments, the transmitter 24 to perform a sending action on the terminal device side in the foregoing method embodiments, and the receiver 23 to perform a receiving action on the terminal device side in the foregoing method embodiments. Implementation principles and technical effects thereof are similar, and details are not described herein again.

Alternatively, when the processor 21 executes the information, the information causes the processor 21 to perform a processing action on the network device side in the foregoing method embodiments, the transmitter 24 to perform a sending action on the network device side in the foregoing method embodiments, and the receiver 23 to perform a receiving action on the network device side in the foregoing method embodiments. Implementation principles and technical effects thereof are similar, and details are not described herein again.

An embodiment of this application further provides a communications system, including a terminal device and a network device, to perform the foregoing communication method.

An embodiment of this application further provides a chip, including a processor and an interface. The interface is configured to input and output data or an instruction processed by the processor. The processor is configured to perform the method provided in the foregoing method embodiments. The chip may be applied to the foregoing communications apparatus.

The present application further provides a computer-readable storage medium. The computer-readable storage medium may include any medium that may store program code, such as a USB flash drive, a mobile hard disk, a read-only memory (ROM), a random access memory (RAM), a magnetic disk, or an optical disc. Specifically, the computer-readable storage medium stores program information, and the program information is used in the foregoing communication method.

An embodiment of this application further provides a program, and the program is used to perform the communication method provided in the foregoing method embodiments when being executed by a processor.

An embodiment of this application further provides a program product, such as a computer-readable storage medium. The program product stores instructions. When the instructions run on a computer, the computer performs the communication method provided in the foregoing method embodiments.

An embodiment of this application further provides an apparatus. The apparatus may include at least one processor and an interface circuit. Related program instructions are executed in the at least one processor, so that the communications apparatus implements the communication method provided in the foregoing method embodiments.

An embodiment of this application further provides a communications apparatus, and the apparatus is configured to perform the communications method provided in the foregoing method embodiments.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the processes or functions described according to the embodiments of the present invention are completely or partly generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any available medium accessible by a computer or a data storage device such as a server or a data center that integrates one or more available media. The available medium may be a magnetic medium (for example, a floppy disk, a hard disk, or a magnetic tape), an optical medium (for example, a DVD), a semiconductor medium (for example, a solid state disk (SSD)), or the like.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of the present invention.

What is claimed is:

1. A communication method, comprising:

receiving, by a terminal device, first information sent by a network device, wherein the first information is used to indicate an identity of a first, stand-alone non-public network, SNPN which the terminal device is handed over to or is to be handed over to through an SNPN handover;

wherein the first information is carried in a registration accept message or a configuration update message transmitted after the SNPN handover.

2. The method according to claim 1, wherein after the receiving, by a terminal device, first information sent by a network device, the method further comprises:

determining, by the terminal device, the identity of the first SNPN based on the first information.

3. The method according to claim 2, wherein the identity of the first SNPN comprises an identity of a public land mobile network, PLMN, and a network identifier, NID.

4. The method according to claim 3, wherein the first information comprises the identity of the first SNPN.

5. The method according to claim 1, wherein the first information is carried in an independent information element corresponding to the identity of the first SNPN.

6. The method according to claim 1, wherein the method further comprises:

sending, by the terminal device, a registration complete message or a configuration update acknowledge message to the network device, wherein the registration complete message or the configuration update acknowledge message is used to confirm that a 5G GUTI is valid.

7. The method according to claim 1, wherein the identity of the first SNPN is forwarded by an access stratum of the terminal device to a non-access stratum of the terminal device, and the non-access stratum of the terminal device is configured to change a serving network name from an identity of a second SNPN to the identity of the first SNPN.

8. A terminal device, comprising:

a processor, a memory, a receiver, and an interface for communicating with a network device;

the memory stores computer execution instructions; and the processor executes the computer execution instructions stored in the memory to cause the receiver to:

receive first information sent by the network device, wherein the first information is used to indicate an identity of a first stand-alone non-public network, SNPN, which the terminal device is handed over to or is to be handed over to through an SNPN handover;

wherein the first information is carried in a registration accept message or a configuration update message transmitted after the SNPN handover.

9. The terminal device according to claim 8, wherein the processor is configured to:

determine the identity of the first SNPN based on the first information after the first information is received.

10. The terminal device according to claim 9, wherein the identity of the first SNPN comprises an identity of a public land mobile network, PLMN, and a network identifier, NID.

11. The terminal device according to claim 10, wherein the first information comprises the identity of the first SNPN.

12. The terminal device according to claim 8, wherein the first information is carried in an independent information element corresponding to the identity of the first SNPN.

13. A network device, comprising:

a processor, a memory, a transmitter, and an interface for communicating with a network terminal device;

the memory stores computer execution instructions; and the processor executes the computer execution instructions stored in the memory to cause the transmitter to:

send first information to the terminal device, wherein the first information is used to indicate an identity of a first stand-alone non-public network, SNPN, which the terminal device is handed over to or is to be handed over to through an SNPN handover;

wherein the first information is carried in a registration accept message or a configuration update message transmitted after the SNPN handover.

14. The network device according to claim 13, wherein the identity of the first SNPN comprises an identity of a public land mobile network, PLMN, and a network identifier, NID.

15. The network device according to claim 14, wherein the first information comprises the identity of the first SNPN.

16. The network device according to claim 13, wherein the first information is carried in an independent information element corresponding to the identity of the first SNPN.

17. The network device according to claim 13, wherein the network device further comprises a receiver, and the receiver is configured to:

receive a registration complete message or a configuration update acknowledge message sent by the terminal device, wherein the registration complete message or the configuration update acknowledge message is used to confirm that a 5G GUTI is valid.

* * * * *